US006919552B2

(12) United States Patent
Flower

(10) Patent No.: US 6,919,552 B2
(45) Date of Patent: Jul. 19, 2005

(54) OPTICAL DETECTOR AND METHOD FOR DETECTING INCIDENT LIGHT

(75) Inventor: Graham McRae Flower, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 355 days.

(21) Appl. No.: 10/303,506

(22) Filed: Nov. 25, 2002

(65) Prior Publication Data

US 2004/0099791 A1 May 27, 2004

(51) Int. Cl.⁷ .......................... H01J 40/14; H01L 29/786
(52) U.S. Cl. ............... 250/214 R; 250/214.1; 257/435
(58) Field of Search .......................... 250/214 R, 214.1; 257/435, 462

(56) References Cited

U.S. PATENT DOCUMENTS

| 3,304,431 | A | * | 2/1967 | Biard et al. ............ 250/551 |
| 4,916,307 | A | | 4/1990 | Nishibe et al. |
| 5,818,322 | A | | 10/1998 | Tasumi |
| 6,075,253 | A | | 6/2000 | Sugiyama et al. |
| 6,552,362 | B2 | * | 4/2003 | Ohtani et al. ............ 257/71 |

* cited by examiner

Primary Examiner—Stephone B. Allen

(57) ABSTRACT

An optical detector and method for detecting incident light utilizes a pair of photosensitive devices in which one of the photosensitive devices is selectively exposed to the incident light to generate differential current signals that can be used to measure the intensity of the incident light. The photosensitive devices may be phototransistors having a silicon-germanium (SiGe) absorption region that is able to convert longer wavelength light, such as 980 nm or 1300 nm light, into current. The SiGe phototransistors may be fabricated on a silicon substrate.

20 Claims, 4 Drawing Sheets

OPTICAL DETECTOR AND METHOD FOR DETECTING INCIDENT LIGHT

FIELD OF THE INVENTION

The invention relates generally to semiconductor devices, and more particularly to an optical detector for detecting incident light.

BACKGROUND OF THE INVENTION

The use of silicon (Si) to manufacture integrated circuits (ICs) is a well-developed technology. Since early years of IC development, silicon has dominated the field of electronics to become the most widely used material to fabricate and integrate various electronic devices, in particular solid-state transistors such as bipolar and metal oxide semiconductor (MOS) transistors. Consequently, silicon technology has significantly advanced in comparison to other alternative technologies. As a result, Si-based ICs have a number of advantages over other technologies. For example, Si-based ICs can be manufactured with relative ease using established semiconductor processes. In addition, an extremely high density of electronic devices can be fabricated on Si-based ICs.

The preference of Si-based ICs makes it desirable to fabricate photosensitive devices in this material, such as photodiodes and phototransistors, so that the photosensitive devices and the supporting circuit to drive the devices can be integrated. However, due to the bandgap of Si, photosensitive devices fabricated on Si do not operate well for detecting light having wavelengths longer than approximately 850 nm and are somewhat less efficient due to the indirect nature of bandgap. Unfortunately, for longer distances, fiber optic devices favor wavelengths longer than 850 nm, such as 980 nm or 1300 nm, because attenuation and dispersion effects are lower at these longer wavelengths. In addition, the longer wavelengths allow single mode operation.

Si-based photodiodes that are sensitive to light having wavelength greater than 850 nm are described in various U.S. patents. These Si-based photodiodes devices use germanium (Ge) to absorb longer wavelength photons, e.g. 1300 nm photons. Unlike Si, which has a bandgap of 1.1 eV, Ge has a bandgap of 0.67 eV. Thus, Ge can be used to more efficiently absorb 1300 nm photons. As an example, U.S. Pat. No. 6,075,253 issued to Sugiyama et al. describes a semiconductor photodetector that includes a photo-absorption Ge monocrystal layer sandwiched between an n-type Ge layer and a p-type Ge layer within in a recess formed on a Si substrate. The described semiconductor photodetector further includes a p-type layer on the p-type Ge layer within the recess. The semiconductor photodetector of Sugiyama et al. is described as being sensitive to light having wavelength of 1000 nm or greater.

A concern with conventional Si-based Ge photodiodes is that, when used in optical detectors, their sensitivity to longer wavelength light may not be sufficient for certain applications. In addition, conventional Si-based Ge photodiodes may require a more complex fabrication process than other types of photodiodes, which translates into increased manufacturing cost.

In view of these concerns, there is a need for an optical detector and method for detecting incident light that utilizes a Si-based Ge photosensitive device, which can be fabricated using a standard SiGe fabrication process, and has high sensitivity for detecting longer wavelength light, such as 980 nm or 1300 nm light.

SUMMARY OF THE INVENTION

An optical detector and method for detecting incident light utilizes a pair of photosensitive devices in which one of the photosensitive devices is selectively exposed to the incident light to generate differential current signals that can be used to measure the intensity of the incident light. The photosensitive devices may be phototransistors having a silicon-germanium (SiGe) absorption region that is able to convert longer wavelength light, such as 980 nm or 1300 nm light, into current. The SiGe phototransistors may be fabricated on a silicon substrate. Consequently, the SiGe phototransistors and other electrical components of the optical detector can be integrated into a single semiconductor structure. Using the differential current generated by the photosensitive devices, the optical detector can detect incident light having wavelengths longer than 850 nm, such as 980 nm or 1300 nm light, with increased sensitivity and low noise.

In accordance with the invention, an optical detector includes a differential pair of phototransistors in which one of the phototransistor is shielded from incident light by an opaque layer. Each phototransistor may include an absorption region formed of a silicon-germanium alloy, which allows the phototransistors to be sensitive to longer wavelength light, such as 980 nm or 1300 nm light. In addition, the silicon-germanium absorption region allows the phototransistors to be fabricated on a silicon substrate using a standard silicon-germanium fabrication process. The optical detector further includes a transimpedance amplifier that provides high impedance voltage and differential transimpedance gain for the phototransistors.

In the presence of incident light, the exposed phototransistor generates an output current signal in response to the incident light, while the shielded phototransistor generates a reference current signal. The output and reference current signals are amplified by the transimpedance amplifier and the phototransistors, which operate as a differential amplifier. These amplified signals can then be used to detect the incident light.

Other aspects and advantages of the present invention will become apparent from the following detailed description, taken in conjunction with the accompanying drawings, illustrated by way of example of the principles of the invention.

DETAILED DESCRIPTION

Figure 1:
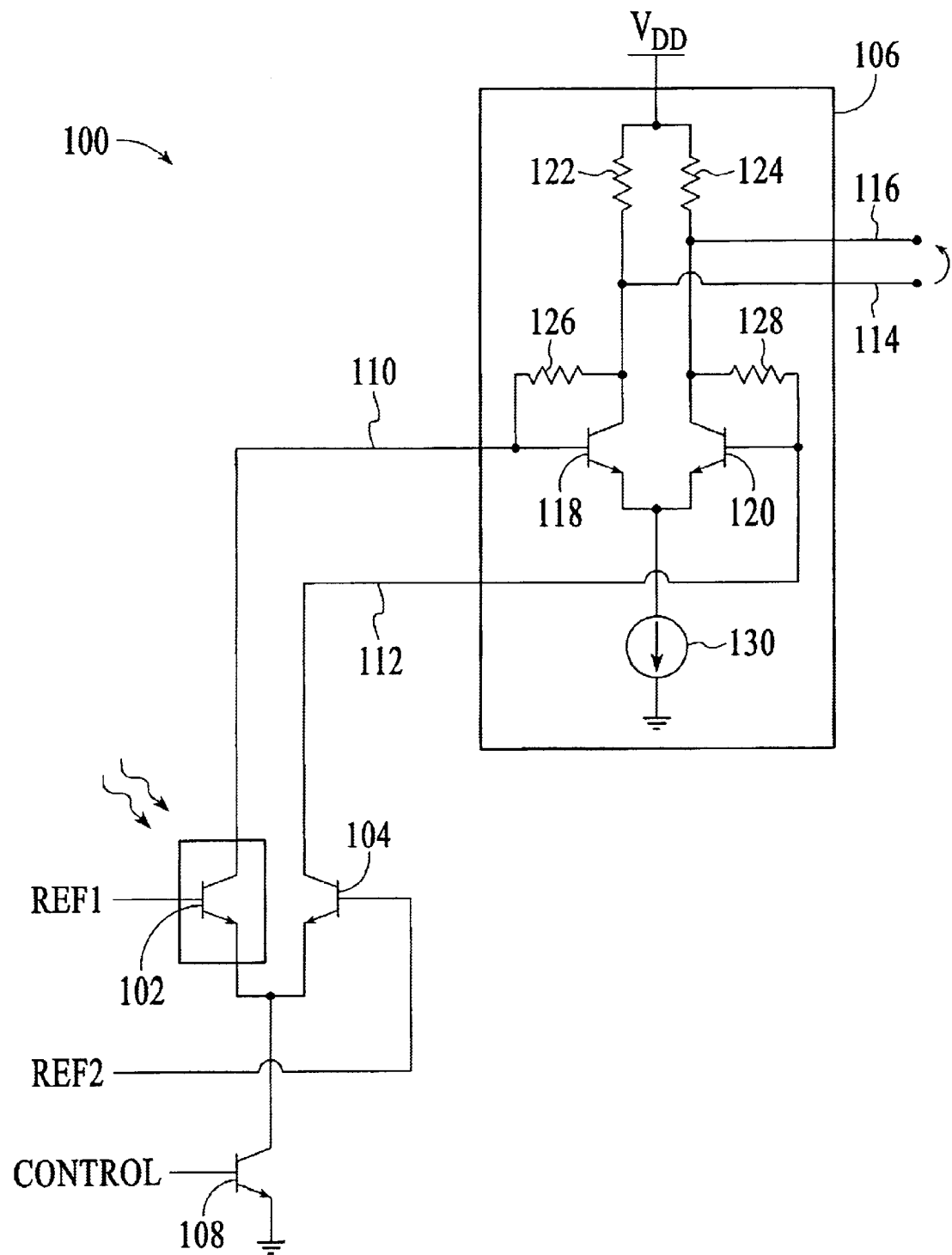
FIG. 1 is a schematic of an optical detector in accordance with an exemplary embodiment of the present invention.

With reference to FIG. 1, an optical detector 100 in accordance with an exemplary embodiment of the invention is shown. The optical detector utilizes a differential pair of silicon-germanium (SiGe) phototransistors 102 and 104 in which only one of the phototransistors is exposed to incident light to generate differential currents, which are twice amplified and turned into differential voltage signals. The differential voltage signals can be used to measure the intensity of the incident light. The SiGe phototransistors can be fabricated on a Si substrate so that the phototransistors and other Si-based electrical components of the optical detector can be integrated into a single semiconductor structure. Using the differential pair of SiGe phototransistors, the optical detector is able to detect incident light having wavelengths longer than 850 nm, such as 980 nm or 1300 nm light, with increased sensitivity and low noise.

As illustrated in FIG. 1, the optical detector 100 includes a transimpedance amplifier 106, a bias bipolar transistor 108 and the differential pair of SiGe phototransistors 102 and 104. The transimpedance amplifier operates to provide high impedance voltages to the SiGe phototransistors. The transimpedance amplifier has inputs 110 and 112 that are electrically connected to the SiGe phototransistors to provide the high current gain and bias. The transimpedance amplifier also has outputs 114 and 116 to output differential voltage signals, which are derived from the differential currents generated by the SiGe phototransistors 102 and 104.

The transimpedance amplifier 106 includes a pair of bipolar transistors 118 and 120, resistors 122, 124, 126 and 128 and a current source 130. The resistors 122 and 124 are connected to supply voltage $V_{DD}$ and to the bipolar transistors 118 and 120, respectively. The collector of the transistor 118 is connected to the resistor 122, while the emitter of the transistor 118 is connected to the current source, which is connected to ground. Similarly, the collector of the transistor 120 is connected to the resistor 124, while the emitter of the transistor 120 is connected to the current source. The bases of the transistors 118 and 120 are connected to the inputs 110 and 112, respectively. The base of the transistor 118 is also connected to the resistor 126, which is connected to the collector of the transistor 118, in a shunt feedback configuration. Similarly, the base of the transistor 120 is connected to the resistor 128, which is connected to the collector of the transistor 120.

The operation of the transimpedance amplifier 106 is well known in the field of electronics, and thus, is not described herein in detail. The transimpedance amplifier operates to amplify the differential currents generated by the SiGe phototransistors 102 and 104 to produce the differential voltage signals on the outputs 114 and 116. Thus, the transimpedance amplifier provides differential transimpedance gain for the differential currents generated by the SiGe phototransistors 102 and 104. The differential voltage signal on the output 114 corresponds to the differential current generated by the SiGe phototransistor 102, while the differential voltage signal on the output 116 corresponds to the differential current generated by the SiGe phototransistor 104.

As stated above, the SiGe phototransistors 102 and 104 of the optical detector 100 operate to generate differential currents in response to incident light. The optical detector is constructed such that only the SiGe phototransistor 102 is exposed to incident light. The other SiGe phototransistor 104 is shielded from the incident light, as described below. Consequently, only the differential current generated by the SiGe phototransistor 102 includes current generated as a result of absorption of the incident light, i.e., photo-generated current. Since the SiGe phototransistor 104 is shielded from the incident light, the differential current generated by the SiGe phototransistor 104 does not include any photo-generated current, and thus, can be used as a reference to measure the photo-generated portion of the differential current generated by the SiGe phototransistor 102. The differential current generated by the SiGe phototransistor is referred herein as the photo-related base current, while the differential current generated by the SiGe phototransistor is referred herein as the reference base current, which may be nominal. The difference between the two differential currents generated by the SiGe phototransistors 102 and 104 is a measure of the intensity of the incident light.

The SiGe phototransistors 102 and 104 are configured as a differential amplifier. Thus, the differential currents generated by the SiGe phototransistors are amplified by the phototransistors. The emitters of the SiGe phototransistors 102 and 104 are both connected to the bias transistor 108, which in turn is connected to ground. The bias transistor provides bias currents for the SiGe phototransistors in response to CONTROL signal applied to the base of the bias transistor. The bases of the SiGe phototransistor 102 and 104 are configured to receive REF1 and REF2 signals, which control the amount of current conducted by each phototransistor. In the exemplary embodiment, the REF1 and REF2 signals are the same so that the only difference between the photo-related current generated by the SiGe phototransistor 102 and the reference current generated by the SiGe phototransistor 104 is the photo-generated current caused by incident light on the phototransistor 102. The collectors of the SiGe phototransistors are connected to the inputs 110 and 112 of the transimpedance amplifier 106, which further amplifies the amplified differential currents generated by the SiGe phototransistors 102 and 104 and produces the differential voltage signals on the outputs 114 and 116.

Figure 2:
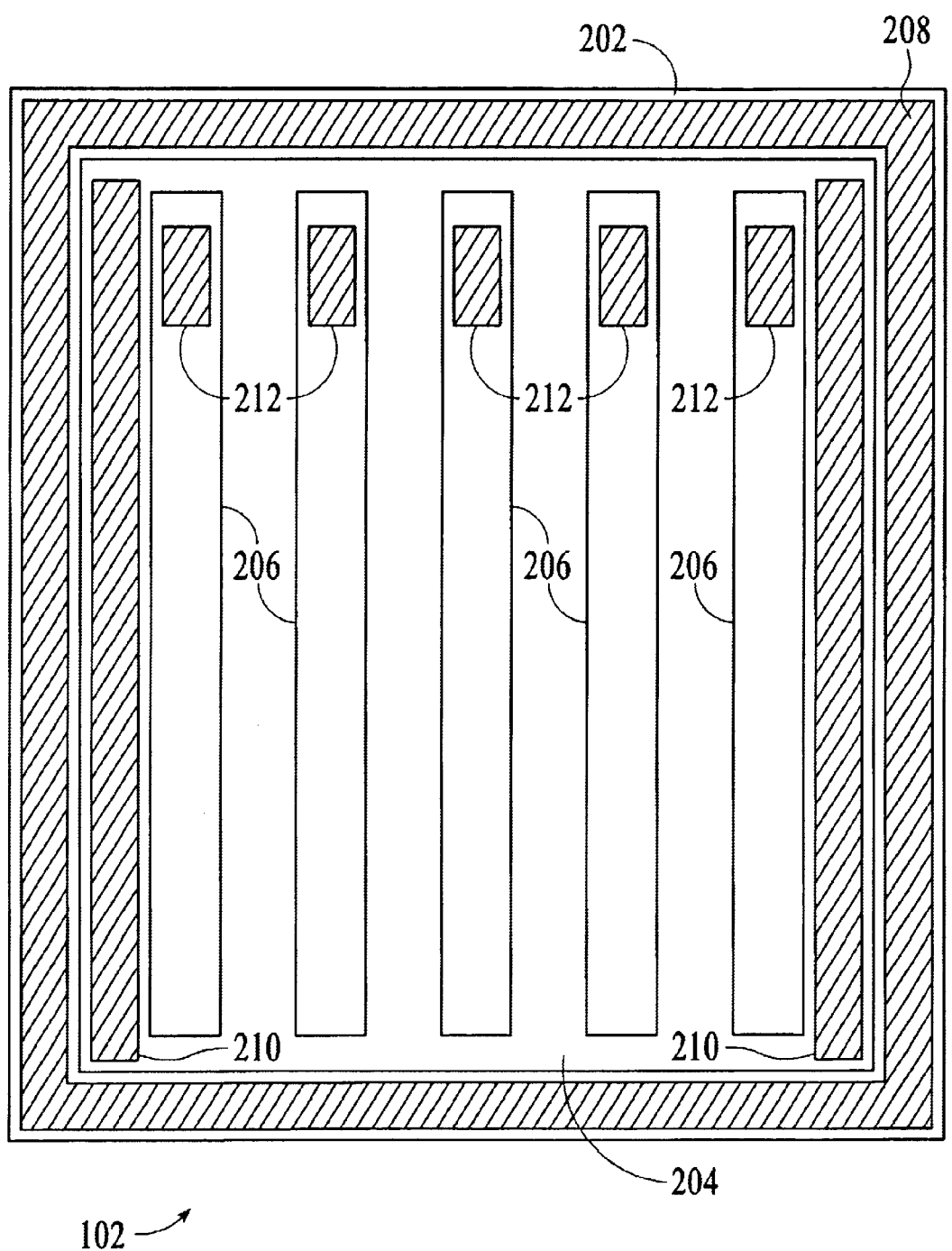
FIG. 2 is a planar layout of a SiGe phototransistor, which is exposed to incident light, included in the optical detector of FIG. 1.
Figure 3:
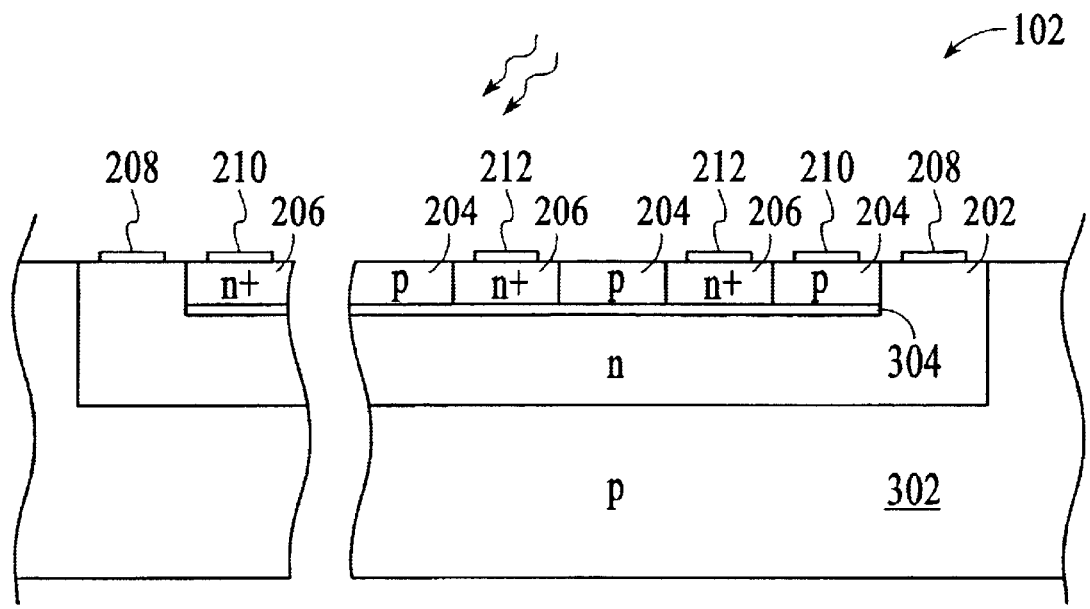
FIG. 3 is a cross-sectional view of the SiGe phototransistor of FIG. 2.

The SiGe phototransistors 102 and 104 are illustrated and described herein as bipolar phototransistors. However, the SiGe phototransistors may be another type of phototransistors, such as light sensitive field-effect transistors (FETs). Structurally, the two SiGe phototransistors are identical. Thus, only the SiGe phototransistor 102 is described herein in detail. FIG. 2 shows a planar layout of the SiGe phototransistor 102, while FIG. 3 shows a cross-sectional view of the SiGe phototransistor. As illustrated, the SiGe phototransistor 102 includes an n-type collector region 202, a p-type base region 204 and n-type emitter regions 206. Although five n-type emitter regions are illustrated, the SiGe phototransistor may include fewer or more n-type emitter regions. As shown in FIG. 3, the collector region 202 is formed on a Si substrate 302. The base region 204 is formed in the collector region, and similarly, the emitter regions 206 are formed in the base region. The emitter regions are formed in the base region such that the emitter regions define elongated areas, as illustrated in FIG. 2. As a result, the base region includes corresponding elongated portions, which are defined by the base regions, between the base regions and between the outermost base regions and the collector region.

The SiGe phototransistor 102 further includes a layer 304 of SiGe alloy, as shown in FIG. 3, which serves as a photon absorption layer that can absorb light having wavelengths longer than 850 nm, such as 1300 nm light. The cutoff wavelength will be a function of the exact composition of the SiGe layer. The SiGe layer can be selectively deposited above the collector region 202 by a low temperature epitaxy. As an example, the SiGe layer may be grown at approximately 630 degrees Celsius to a thickness of approximately 0.1 microns. Other components of the SiGe phototransistor can be fabricated using a conventional semiconductor fabrication process.

The SiGe phototransistor 102 further includes a collector metal strip 208, base metal strips 210 and emitter metal strips 212, which are situated above the respective regions. These metal strips provide conductive areas to electrically contact the various regions of the SiGe phototransistor. However, the base and emitter metal strips impede light from reaching the SiGe layer 302 of the phototransistor, where light is absorbed and charge carrier pairs are created to generate current. In order to increase the amount of incident light that can reach the SiGe layer, the collective area occupied by the base and emitter metal strips in the SiGe phototransistor is reduced. Unlike conventional bipolar transistors, the emitter metal strips 212 do not extend along the entire length of the respective emitter regions 206, as illustrated in FIG. 2. The emitter metal strips extend less than half of the length of the respective emitter regions. In the exemplary embodiment, the emitter metal strips extend less than quarter of the length of the respective emitter regions. In addition, the SiGe phototransistor includes only two base metal strips 210 between the outermost emitter regions and the collector region. A conventional bipolar transistor further includes base metal strips between the emitter regions. Consequently, the area of the SiGe phototransistor 102 occupied by the base and emitter metal strips is significantly reduced to increase the amount of light that can reach the SiGe layer 304 for photon-to-current conversion. This structure will have increased parasitic resistance in the base and emitter terminals. However, since speed is not a primary concern, this is a good tradeoff.

Figure 4:
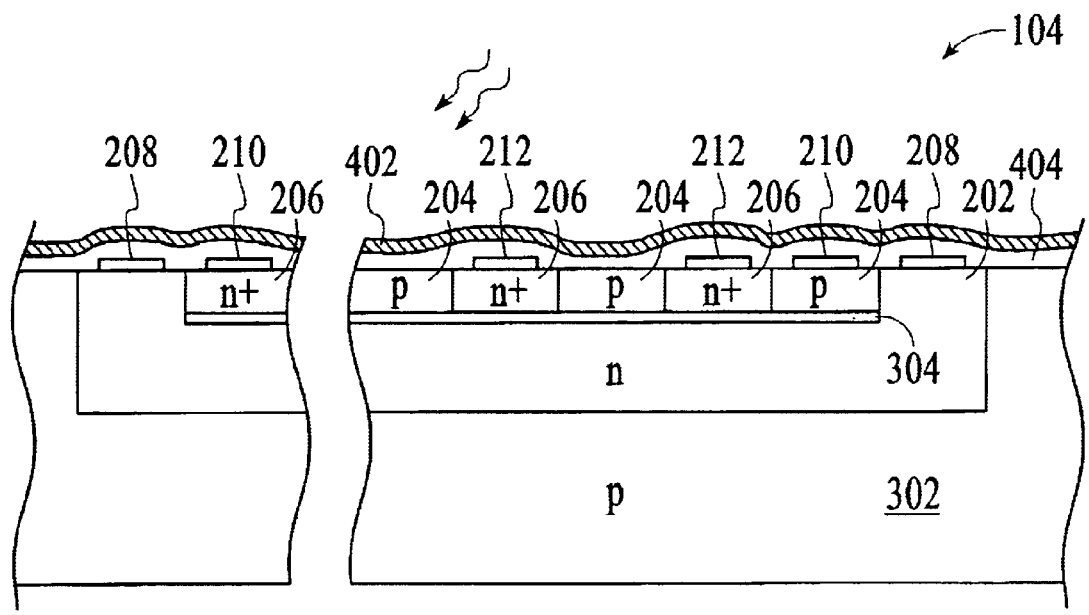
FIG. 4 is a cross-sectional view of a SiGe phototransistor, which is covered by an opaque metal layer to shield the phototransistor from incident light, included in the optical detector of FIG. 1.

As stated above, the SiGe phototransistor 104 is structurally identical to the SiGe phototransistor 102. However, as illustrated in FIG. 4, the SiGe phototransistor 104 is covered by an opaque metal layer 402, which shields the phototransistor from incident light. The opaque metal layer is patterned so that only the SiGe phototransistor 102 is exposed. The various metal strip 208, 210 and 212 of the SiGe phototransistor 104 are electrically insulated from the opaque metal layer by an insulating layer 404, which may be a layer of $SiO_2$. Due to the opaque metal layer, any incident light on the optical detector 100 can only reach the SiGe phototransistor 102. Consequently, the base current signal generated by the SiGe phototransistor 104 is independent of the incident light. That is, the base current signal of SiGe phototransistor 104 does not include any contribution from current generated from absorption of incident light.

The optical detector 100 may not be suitable as a front end detector because the sensitivity of the SiGe phototransistor 102 may not be sufficient for such an application. However, the optical detector can function well as a monitoring device to measure the continuing performance of a laser of a fiber optic device. As an example, an array of such optical detectors may be fabricated on a single silicon chip and attached to an array of lasers to individually monitor the performance of the lasers. The use of the optical detector as a monitoring device allows compensation for the aging behavior of a laser, which increases the useful operating life of the fiber optic device.

Figure 5:
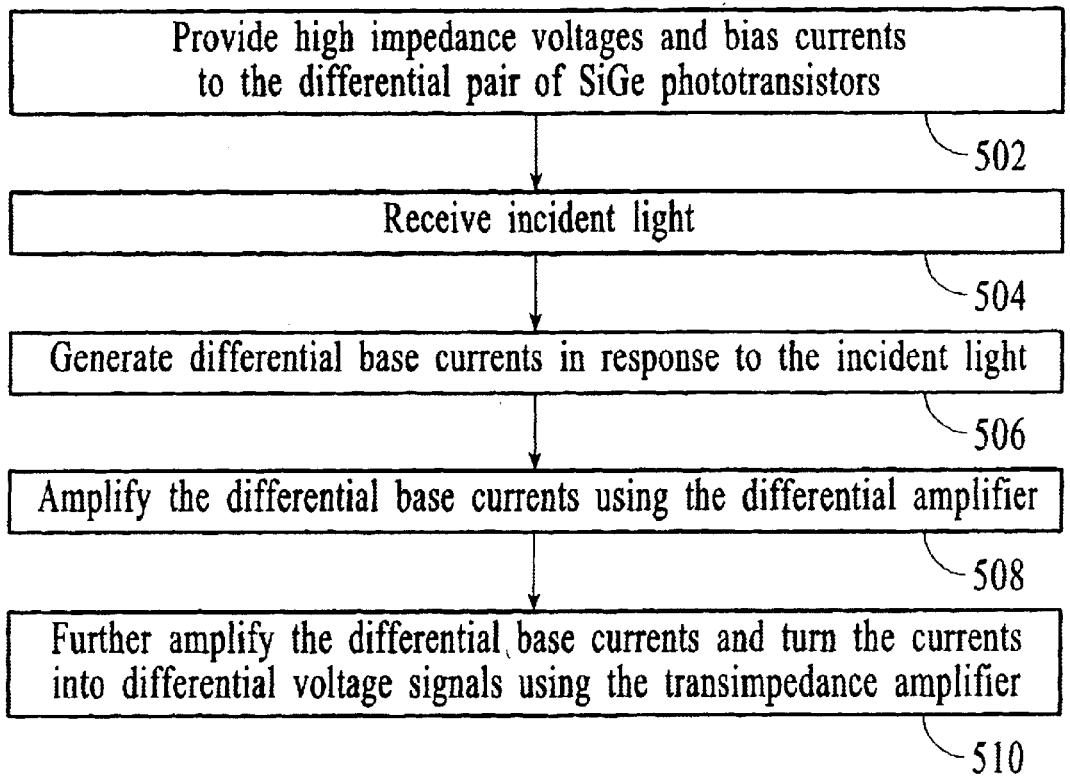
FIG. 5 is a flow diagram of a method of measuring incident light in accordance with an exemplary embodiment of the present invention.

The operation of the optical detector 100 is described with reference to the flow diagram of FIG. 5. At block 502, high impedance voltages are provided to the differential pair of SiGe phototransistors 102 and 104 by the transimpedance amplifier 106. The high impedance voltages are applied to the collectors of the phototransistors. In addition, bias currents are provided to the SiGe phototransistors by the bias bipolar transistor 108. Next, at block 504, incident light is received by the optical detector. Since the SiGe phototransistor 104 is covered by the opaque metal layer 402, the incident light is only received by the SiGe phototransistor 102. Thus, at block 506, differential base currents are generated by the SiGe phototransistors 102 and 104. Next, at block 508, the differential base currents are amplified by the SiGe phototransistors 102 and 104, which functions as a differential amplifier. At block 510, the amplified differential currents are further amplified and turned into differential voltage signals on the outputs 114 and 116 by the transimpedance amplifier 106.

In the exemplary embodiment, the high impedance voltages provided by the transimpedance amplifier 106 are such that the $V_{ce}$ voltages of the SiGe phototransistors 102 and 104 are sufficiently high to operate the phototransistors close to or into the avalanche region. As a result, the difference between the photo-related base current signal and the reference base current signal is maximized. Furthermore, noise is reduced because devices operating in the avalanche or punchthrough regime exhibit lower noise performance.

Figure 6:
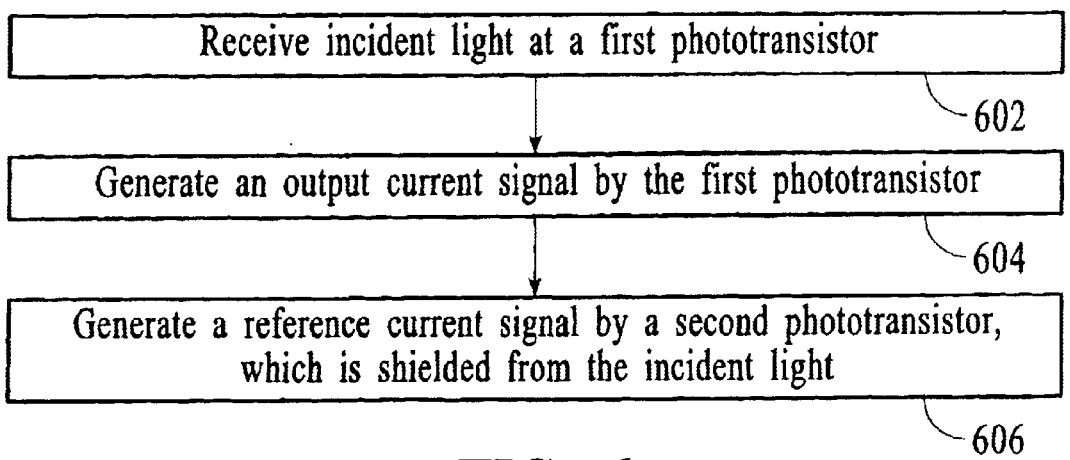
FIG. 6 is a method of detecting light incident in accordance with an exemplary embodiment of the invention.

A method of detecting incident light in accordance with an exemplary embodiment of the invention is described with reference to FIG. 6. At step 602, the incident light is received at a first phototransistor. The incident light may be light having wavelength greater than 850 nm. In the exemplary embodiment, the first phototransistor is a Si-based phototransistor having a photon absorption layer of SiGe alloy. Next, at step 604, an output current signal is generated by the first phototransistor in response to the incident light. At step 606, a reference current signal is generated by a second phototransistor, which is shielded from the incident light such that the reference current signal is independent of the incident light. In the exemplary embodiment, the second phototransistor is structurally identical to the first phototransistor. The output current signal and the reference current signal are differential signals that provide a differential current detection of the incident light.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An optical detector comprising:
  a first phototransistor containing germanium configured to generate an output current signal in response to incident light;
  a second phototransistor electrically coupled to said first phototransistor, said second phototransistor being configured to generate a reference current signal; and
  an opaque layer positioned over said second phototransistor to block said incident light to said second phototransistor such that said reference current signal is independent of said incident light, said output current signal and said reference current signal providing detection of said incident light.

2. The optical detector of claim 1 wherein said first phototransistor includes an absorption region containing said germanium.

3. The optical detector of claim 2 wherein said absorption region of said first phototransistor contains silicon-germanium alloy.

4. The optical detector of claim 3 wherein said absorption region of said first phototransistor has a thickness of approximately 0.1 microns.

5. The optical detector of claim 1 further comprising a silicon substrate, said first and second phototransistors being fabricated on said silicon substrate.

6. The optical detector of claim 1 wherein at least one said first and second phototransistors includes elongated first conductivity regions in a second conductivity region and conductive strips coupled to said elongated first conductivity regions, each of said conductive strips extending less than half the length of a corresponding first conductivity region.

7. The optical detector of claim 1 wherein at least one of said first and second phototransistors includes elongated first conductivity regions in a second conductivity region and at least one conductive strip selectively coupled to said second conductivity region such that some of elongated portions of said second conductivity region defined by said elongated first conductivity regions are not coupled to said at least one conductive strip.

8. The optical detector of claim 1 further comprising a transimpedance amplifier connected to said first and second phototransistors to provide high impedance voltage and differential transimpedance gain.

9. A method of detecting incident light comprising:

receiving said incident light at a first phototransistor containing germanium;

generating a first signal in response to said incident light by said first phototransistor; and generating a second signal by a second phototransistor, said second phototransistor being shielded from said incident light such that said reference current signal is independent of said incident light, said first and second signals providing detection of said incident light.

10. The method of claim 9 wherein said generating of said first signal includes converting a portion of said incident light to current at an absorption region of said first phototransistor, said absorption region containing said germanium.

11. The method of claim 9 wherein at least one of said first and second phototransistors is fabricated on a silicon substrate.

12. The method of claim 9 further comprising amplifying said first and second signals using a differential amplifier that includes said first and second phototransistors.

13. The method of claim 12 further comprising providing sufficient voltage to said first and second phototransistors such that said first and second phtotransistors are operating close to or into the avalanche region.

14. The method of claim 12 further comprising amplifying said first and second signals using a transimpedance amplifier.

15. An optical detector comprising:

a silicon-based substrate;

first and second photosensitive devices fabricated on said silicon-based substrate, said first and second photosensitive devices being configured to generate differential current signals, said first photosensitive device including an absorption region containing germanium; and an opaque layer positioned over said second photosensitive device to selectively shield said second photosensitive device from said incident light such that one of said differential current signals is generated by said first photosensitive device in response to said incident light, said differential current signals providing detection of said incident light.

16. The optical detector of claim 15 wherein said absorption region contains silicon-germanium alloy.

17. The optical detector of claim 15 wherein at least one of said first and second photosensitive devices includes a phototransistor.

18. The optical detector of claim 17 wherein said phototransistor includes elongated first conductivity regions in a second conductivity region and conductive strips coupled to said elongated first conductivity regions, each of said conductive strips extending less than half the length of a corresponding first conductivity region.

19. The optical detector of claim 17 wherein said phototransistor includes elongated first conductivity regions in a second conductivity region and at least one conductive strip selectively coupled to said second conductivity region such that some of elongated portions of said second conductivity region defined by said elongated first conductivity regions are not coupled to said at least one conductive strip.

20. The optical detector of claim 17 further comprising a transimpedance amplifier connected to said phototransistor to provide high impedance voltage and gain so that said phototransistor can operate close to or into the avalanche region.

* * * * *